(12) United States Patent
Kim

(10) Patent No.: US 12,530,393 B2
(45) Date of Patent: Jan. 20, 2026

(54) METHOD AND SYSTEM FOR REFINING SEARCH RESULTS BASED ON QUERY COMPLEXITY FOR GENERATIVE SEARCH

(71) Applicant: NOTA, INC., Daejeon (KR)

(72) Inventor: Geonmin Kim, Daejeon (KR)

(73) Assignee: NOTA, INC., Daejeon (KR)

( * ) Notice: Subject to any disclaimer, the term of this patent is extended or adjusted under 35 U.S.C. 154(b) by 0 days.

(21) Appl. No.: 18/808,952

(22) Filed: Aug. 19, 2024

(65) Prior Publication Data

US 2025/0190479 A1   Jun. 12, 2025

(30) Foreign Application Priority Data

Dec. 12, 2023   (KR) .................. 10-2023-0179501

(51) Int. Cl.
  *G06F 16/383*   (2019.01)
  *G06F 16/332*   (2019.01)
  *G06F 40/289*   (2020.01)
(52) U.S. Cl.
  CPC .......... *G06F 16/383* (2019.01); *G06F 16/332* (2019.01); *G06F 40/289* (2020.01)
(58) Field of Classification Search
  None
  See application file for complete search history.

(56) References Cited

U.S. PATENT DOCUMENTS

| | | | |
|---|---|---|---|
| 2005/0119873 A1* | 6/2005 | Chaney | G06F 16/30 707/E17.058 |
| 2017/0357720 A1* | 12/2017 | Torabi | G06F 16/7844 |
| 2019/0065584 A1* | 2/2019 | Fukuda | G06F 16/93 |

FOREIGN PATENT DOCUMENTS

KR   1025515310000   6/2023

* cited by examiner

*Primary Examiner* — Thu N Nguyen
(74) *Attorney, Agent, or Firm* — Christensen O'Connor Johnson Kindness PLLC

(57) ABSTRACT

Disclosed is a method and system for readjusting granularity of search results according to complexity of a query for generative search. An inference method may include extracting a length-by-length phrase from a document retrieved for a query of a user; determining a ranking of the length-by-length phrase in consideration of complexity of the query; and configuring a prompt for input to a generative language model based on the determined ranking. Here, the ranking of the length-by-length phrase may be determined such that a relatively long phrase has a higher ranking according to an increase in the complexity of the query.

16 Claims, 8 Drawing Sheets

METHOD AND SYSTEM FOR REFINING SEARCH RESULTS BASED ON QUERY COMPLEXITY FOR GENERATIVE SEARCH

CROSS-REFERENCE TO RELATED APPLICATION(S)

This application claims the priority benefit of Korean Patent Application No. 10-2023-0179501, filed on Dec. 12, 2023, in the Korean Intellectual Property Office, the disclosure of which is incorporated herein by reference.

BACKGROUND

1. Field of the Invention

Example embodiments relate to a method and system for readjusting granularity of search results according to query complexity for generative search.

2. Description of the Related Art

As the performance of zero-shot generation of a generative large language model (e.g., GPT4) dramatically increases based on scaling law, it has become easier to generate a natural language question-answering system through simple prompt engineering without retraining. However, in many domains such as finance, law, and IT, a language model often is unable to access expert knowledge as learning data and a weight of the language model needs to be retrained to learn knowledge that varies over time. According to an increase in the number of parameters of the language model, significant cost is required to retrain the weight of the language model. Also, the generative language model may cause hallucination that generates content fundamentally different from the fact, and thus a user has inconvenience of having to determine whether it is true.

One method to solve this is to use a generative search model (e.g., retrieval-augmented language model) that conducts a search for a user query and provides a relevant document to the language model. Using the generative search model may make it possible to generate knowledge that varies over time and according to an expert domain without retraining the weight of the language model, by simply updating and indexing a database. Also, the source of answer may be provided, allowing the user to more trust the generated answer. As an additional advantage, it is found that the use of an additional searcher makes it possible for even a smaller language model to have performance similar to that of a relatively larger language model.

Since retrieved documents are pasted to form a prompt and provided to the language model, the prompt needs to be long used for generative search. Most transformer-based language models require an attention operation proportional to the square of a prompt length and charges application programming interface (API) fee in proportion to the number of tokens in the prompt. Also, since it has a maximum length for inference due to limitation of a positional embedding, a sufficient amount of knowledge may not be technically provided depending on the language model. Therefore, a method of reducing the number of tokens in the prompt may need to be considered.

A method used as a standard in large language model community includes a method of extracting a query-related part using Large Language Model (LLM) for each document (llm extractor), a method of removing documents with similar content by comparing embeddings (redundant filter), or combination thereof. In the former case, accuracy is high, but a large language model is used for each document, which leads to increasing cost. Therefore, the use of a phrase retriever capable of extracting only a query-related part may be considered to retrieve a document.

Related material includes Korean Patent Registration No. 10-2551531.

SUMMARY

Example embodiments may provide an inference method and system that may configure a prompt for input to a generative language model based on a ranking of a phrase, which is determined by further reflecting a phrase length as well as relevance between a query and a phrase.

According to an example embodiment, there is provided an inference method performed by a computer device including at least one processor, the inference method including extracting, by the at least one processor, a length-by-length phrase from a document retrieved for a query of a user; determining, by the at least one processor, a ranking of the length-by-length phrase in consideration of complexity of the query; and configuring, by the at least one processor, a prompt for input to a generative language model based on the determined ranking, wherein the determining the ranking of the length-by-length phrase includes determining the ranking of the length-by-length phrase such that a relatively long phrase has a higher ranking according to an increase in the complexity of the query.

According to an aspect, the determining the ranking of the length-by-length phrase may include computing relevance score between a query embedding generated using a query encoder model for the query and each of a plurality of phrase embeddings generated for each length-by-length phrase using a phrase encoder model for the document, and determining the ranking of the length-by-length phrase based on the relevance score.

According to another aspect, the determining the ranking of the length-by-length phrase may include readjusting the ranking of the length-by-length phrase according to a phrase length through a granularity coefficient that is determined such that the relatively long phrase has the higher ranking according to the increase in the complexity of the query.

According to still another aspect, the readjusting may include predicting the granularity coefficient according to the complexity of the query by inputting output of an intermediate layer of a query encoder model to a granularity coefficient inference model combined with the query encoder model that generates a query embedding for the query.

According to still another aspect, the granularity coefficient inference model may include a transformer encoder model that uses the output of the intermediate layer of the query encoder model as input to use existing knowledge learned by the query encoder model for the query.

According to still another aspect, a query encoder model that generates a query embedding for the query and a phrase encoder model that generates a plurality of phrase embeddings for the document may be contrastively trained using learning data that is generated by designating preference for each phrase candidate in a pair of query and phrase candidate group.

According to still another aspect, the phrase candidate group may include a plurality of length-by-length phrase candidates, the preference may be designated through a selection of a labeler on an arbitrary length-by-length phrase candidate among the plurality of length-by-length phrase candidates, and the selection of the labeler may be based on relevance with the query of the arbitrary length-by-length phrase candidate and conciseness of the arbitrary length-by-length phrase candidate.

According to still another aspect, the phrase candidate group may include first phrase candidates extracted from a document containing a correct answer to the query and second phrase candidates extracted for the query from an arbitrary document, and performance of a granularity coefficient inference model combined with the query encoder model may be controlled through a ratio between the number of the first phrase candidates and the number of the second phrase candidates.

According to still another aspect, by contrastively training a granularity coefficient inference model combined with the query encoder model with fixing parameters of a query encoder model that generates a query embedding for the query and a phrase encoder model that generates a plurality of phrase embeddings for the document, the phrase encoder model and the query encoder model may be contrastively trained and the granularity coefficient inference model may increase score of a phrase with high preference and to decrease score of a phrase with low preference for a given query.

According to still another aspect, the inference method may further include generating, by the at least one processor, a response to the query by inputting the configured prompt to the generative language model.

According to an example embodiment, there is provided a computer program stored in a computer-readable recording medium to execute the method on a computer device in conjunction with the computer device.

According to an example embodiment, there is provided a non-transitory computer-readable recording medium storing a program to execute the method on a computer device.

According to an example embodiment, there is provided a computer device including at least one processor configured to execute computer-readable instructions, wherein the at least one processor is configured to extract a length-by-length phrase from a document retrieved for a query of a user, to determine a ranking of the length-by-length phrase in consideration of complexity of the query, and to configure a prompt for input to a generative language model based on the determined ranking, and to determine the ranking of the length-by-length phrase, the at least one processor is configured to determine the ranking of the length-by-length phrase such that a relatively long phrase has a higher ranking according to an increase in the complexity of the query.

According to some example embodiments, there may be provided an inference method and system that may configure a prompt for input to a generative language model based on a ranking of a phrase, which is determined by further reflecting a phrase length as well as relevance between a query and a phrase.

BRIEF DESCRIPTION OF THE DRAWINGS

These and/or other aspects, features, and advantages of the invention will become apparent and more readily appreciated from the following description of embodiments, taken in conjunction with the accompanying drawings of which.

DETAILED DESCRIPTION

Hereinafter, example embodiments will be described with reference to the accompanying drawings.

An inference system according to example embodiments may be implemented by at least one computer device and an inference method according to example embodiments may be performed through at least one computer device included in the inference system. A computer program according to an example embodiment may be installed and executed on the computer device, and the computer device may perform the inference method according to example embodiments under control of the executed computer program. The computer program may be stored in computer-readable recording media to execute the inference method on the computer device in conjunction with the computer device.

Figure 1:
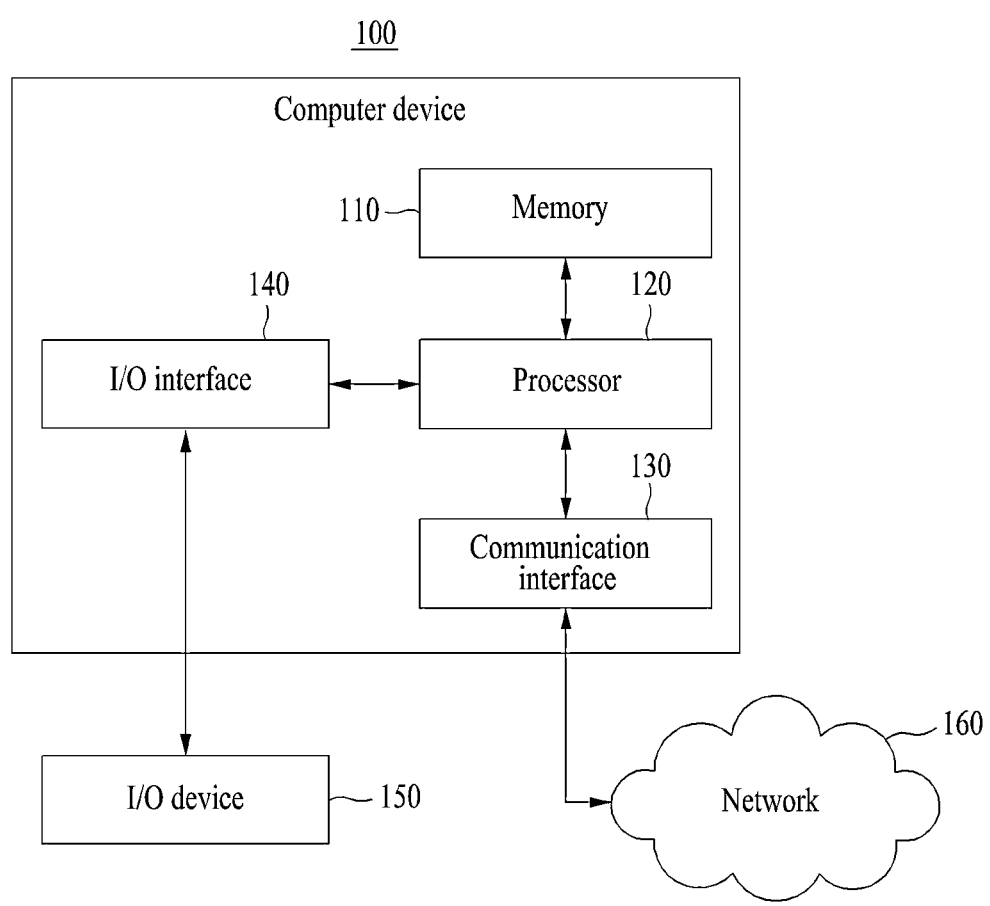
FIG. 1 is a diagram illustrating an example of a computer device according to an example embodiment.

FIG. 1 is a diagram illustrating an example of a computer device according to an example embodiment. Referring to FIG. 1, a computer device 100 may include a memory 110, a processor 120, a communication interface 130, and an input/output (I/O) interface 140. The memory 110 may include a permanent mass storage device, such as a random access memory (RAM), a read only memory (ROM), and a disk drive, as a non-transitory computer-readable recording medium. Here, the permanent mass storage device, such as a ROM and a disk drive, may be included in the computer device 100 as a permanent storage device separate from the memory 110. Also, an OS and at least one program code may be stored in the memory 110. Such software components may be loaded to the memory 110 from another non-transitory computer-readable recording medium separate from the memory 110. The other non-transitory computer-readable recording medium may include a non-transitory computer-readable recording medium, for example, a floppy drive, a disk, a tape, a DVD/CD-ROM drive, a memory card, etc. According to other example embodiments, software components may be loaded to the memory 110 through the communication interface 130, instead of the non-transitory computer-readable recording medium. For example, the software components may be loaded to the memory 110 of the computer device 100 based on a computer program installed by files received over a network 160.

The processor 120 may be configured to process instructions of a computer program by performing basic arithmetic operations, logic operations, and I/O operations. The computer-readable instructions may be provided by the memory 110 or the communication interface 130 to the processor 120. For example, the processor 120 may be configured to execute received instructions in response to a program code stored in a storage device, such as the memory 110.

The communication interface 130 may provide a function for communication between the communication device 100 and another apparatus. For example, the processor 120 of the computer device 100 may forward a request or an instruction created based on a program code stored in the storage device such as the memory 110, data, and a file, to other apparatuses over the network 160 under control of the communication interface 130. Inversely, a signal, an instruction, data, a file, etc., from another apparatus may be received at the computer device 100 through the communication interface 130 of the computer device 100. For example, a signal, an instruction, data, etc., received through the communication interface 130 may be forwarded to the processor 120 or the memory 110, and a file, etc., may be stored in a storage medium, for example, the permanent storage device, further includable in the computer device 100.

The I/O interface 140 may be a device used for interfacing with an I/O device 150. For example, an input device may include a device, such as a microphone, a keyboard, a mouse, etc., and an output device may include a device, such as a display, a speaker, etc. As another example, the I/O interface 140 may be a device for interfacing with an apparatus in which an input function and an output function are integrated into a single function, such as a touchscreen. The I/O device 150 may be configured as a single apparatus with the computer device 100.

Also, according to other example embodiments, the computer device 100 may include a greater or smaller number of components than the number of components of FIG. 1. However, there is no need to clearly illustrate many conventional components. For example, the computer device 100 may be configured to include at least a portion of the I/O device 150 or may further include other components, such as a transceiver and a database.

Figure 2:
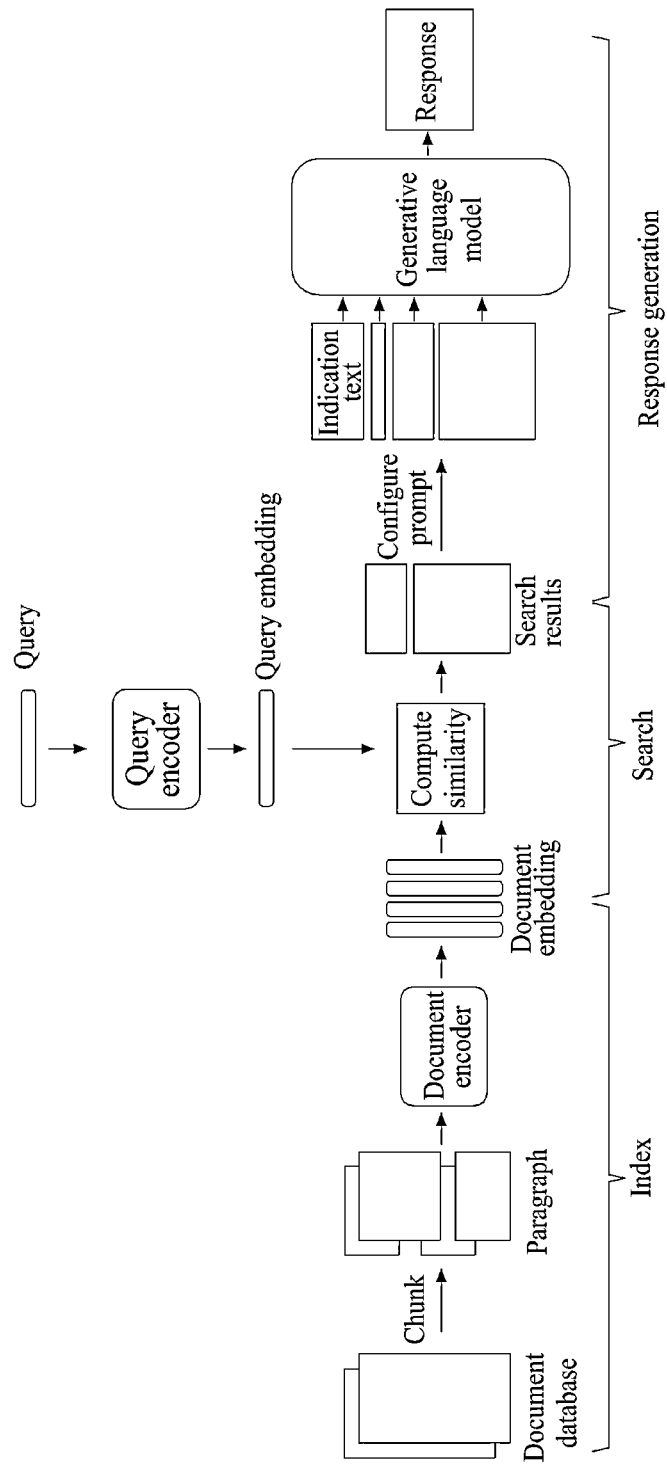
FIG. 2 illustrates an example of a generative search system according to the related art.

FIG. 2 illustrates an example of a process of generating a response to a query in a generative search system according to the related art. The entire process of generating, by the generative search system, a response to a query may include an indexing process of indexing a document, a search process of retrieving a document for a user query, and a response generation process of generating the response to the query using a generative language model based on the retrieved results.

Figure 3:
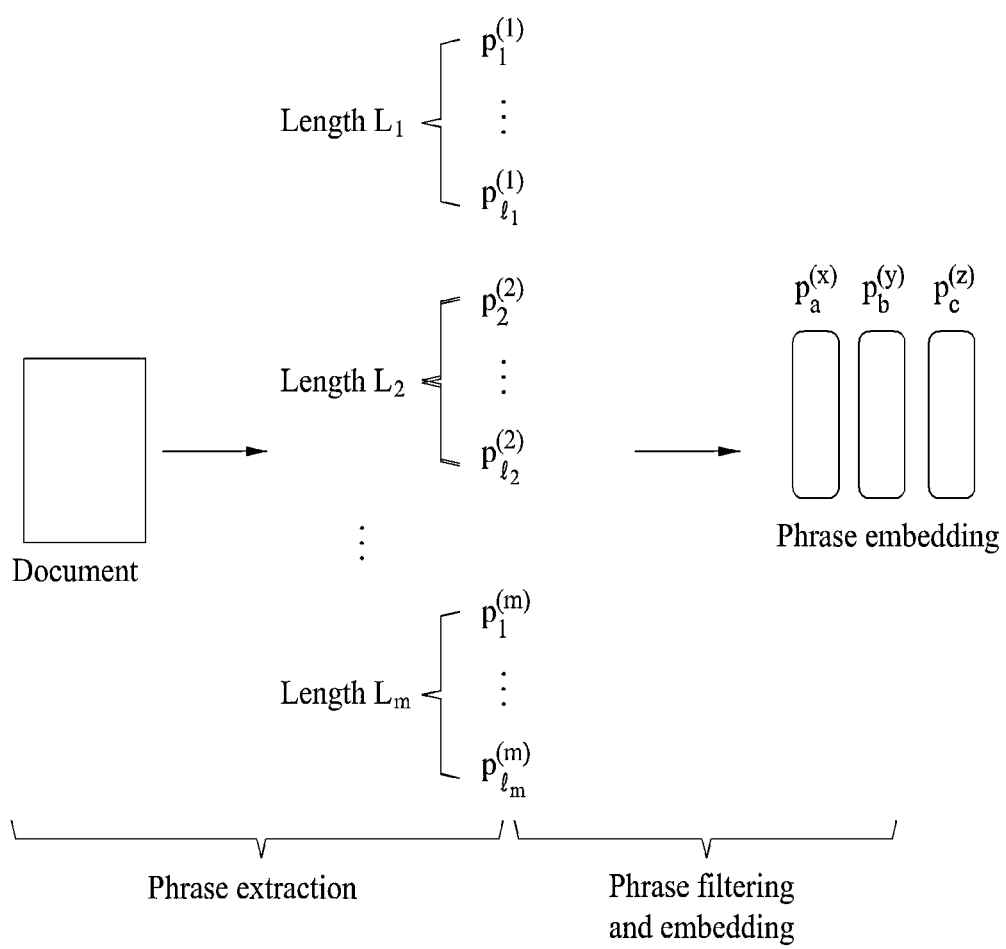
FIG. 3 illustrates an example of a phrase search model according to the related art.

FIG. 3 illustrates an example of a phrase search model according to the related art. The phrase search model may process a phrase extraction process and a phrase filtering and embedding process. The phrase search model may extract a length-by-length phrase from a document in the phrase extraction process. Here, the whole phrases may have an inclusion relationship and/or an overlapping area. Therefore, in the phrase filtering and embedding process, the phrase search model may filter only linguistically meaningful candidates from the entire length-by-length phrases and may vectorize each candidate, indexing documents such that vectorized phrase candidates may be used for search.

The phrase search model is trained to find a correct answer of extractive question and answering in relation to a query, and thus is unsuitable for using search results as input to the generative language model to which sufficient context needs to be immediately provided. Therefore, there is a need for a method that allows a phrase retriever to add context to text to be returned and the granularity of text to be returned may need to be adjusted according to the complexity of the query. For example, detailed context may need to be provided to a complex query and concise context may need to be provided to a simple query.

Figure 4:
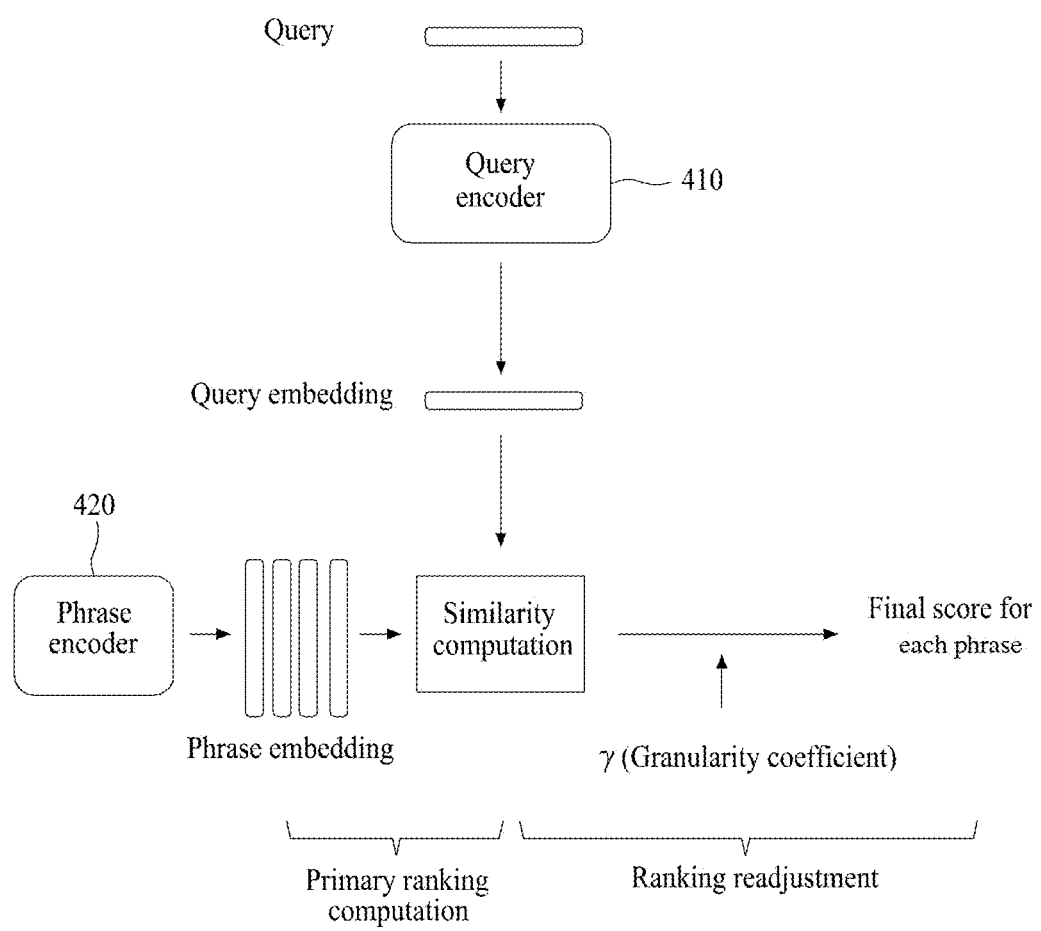
FIG. 4 illustrates an example of changing search score by adjusting a granularity coefficient based on query complexity for scores of retrieved phrases according to an example embodiment.

FIG. 4 illustrates an example of changing search score by adjusting a granularity coefficient based on query complexity for scores of retrieved phrases according to an example embodiment. An inference system may determine a primary ranking by computing relevance score between a query and a phrase. As a detailed example, the inference system may compute relevance score between a query embedding generated using a query encoder 410 for the query and each of a plurality of phrase embeddings generated for each length-by-length phrase using a phrase encoder 420 for the document and may determine the primary ranking of the length-by-length phrase according to the computed relevance score. Subsequently, the inference system may determine the final score of the length-by-length phrase using a granularity coefficient and may readjust the ranking of the length-by-length phrase.

For example, it is assumed that, among N (N is a natural number) phrases, the primary ranking for phrases is determined by relevance score $S_i$ with a query for phrase i ($1 \leq i \leq N$). Here, the final score $\hat{S}_i$ of phrases may be determined according to final granularity coefficient $\gamma$ and length $L_i$ of each phrase, as shown in Equation 1 below.

$$P_i = \frac{e^{S_i}}{\sum_{n=1}^{N} e^{S_n}}$$ [Equation 1]

$$\hat{S}_i = \log P_i - L_i^{\gamma}$$

Here, $S_i$ denotes non-normalized relevance score, and $P_i$ denotes a normalized probability value used to compute the final score $\hat{S}_i$, which may be implemented as a softmax function. Here, if the granularity coefficient $\gamma$ is greater than 0, the final ranking of a relatively short phrase may increase, and if the granularity coefficient $\gamma$ is less than 0, the final ranking of a relatively long phrase may increase.

The granularity coefficient $\gamma$ may be computed using a query as input. This reflects the fact that the more complex the query is the longer context is generally required for answer.

Figure 5:
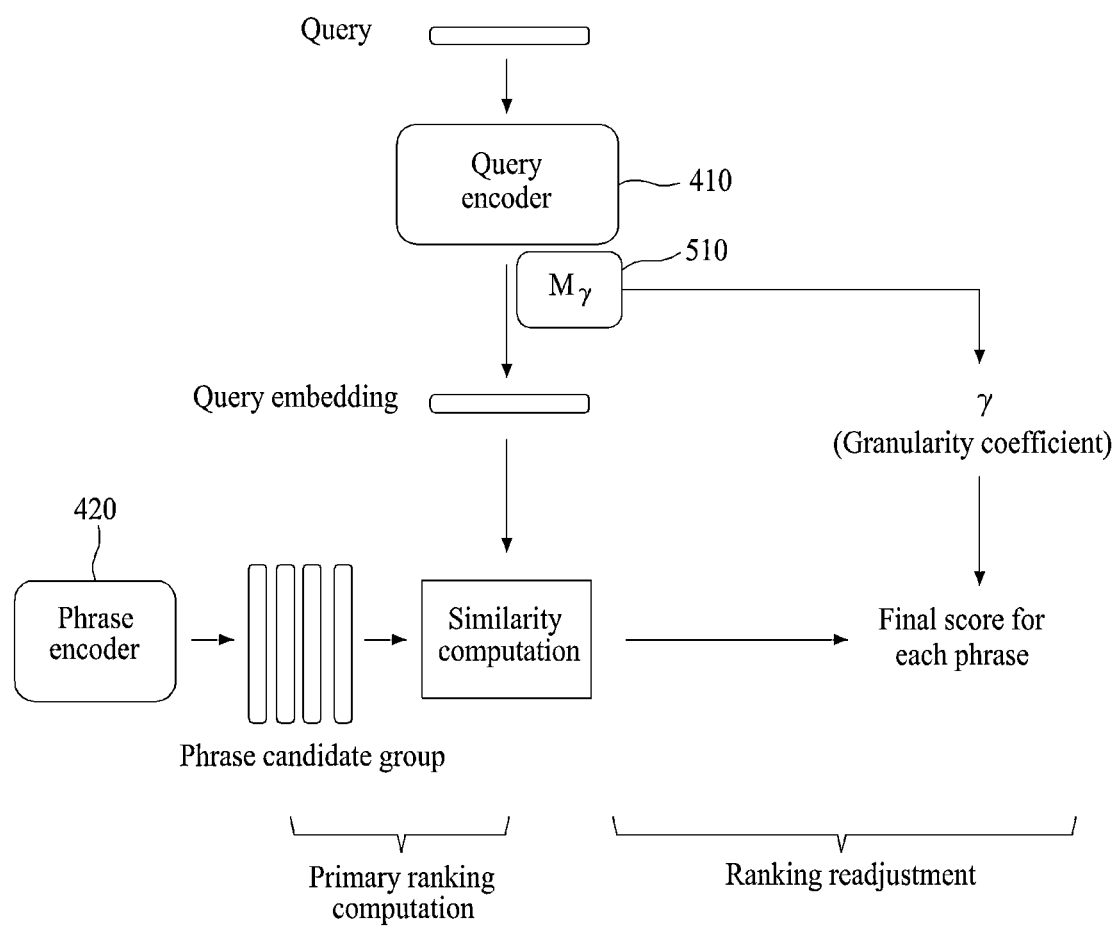
FIG. 5 illustrates an example of using a granularity coefficient inference model according to an example embodiment.

FIG. 5 illustrates an example of using a granularity coefficient inference model according to an example embodiment. In the example embodiment of FIG. 5, to use the existing knowledge learned for a query without changing a previously learned query embedding, the granularity coefficient $\gamma$ may be computed by combining a granularity coefficient inference model 510 that is a new head model above the query encoder 410. The granularity coefficient inference model 510 may compute the granularity coefficient $\gamma$ by receiving intermediate layer output (e.g., logit) of the query encoder 410 as input. For example, the granularity coefficient inference model 510 may be implemented using a transformer encoder model for continuous time series data.

Figure 6:
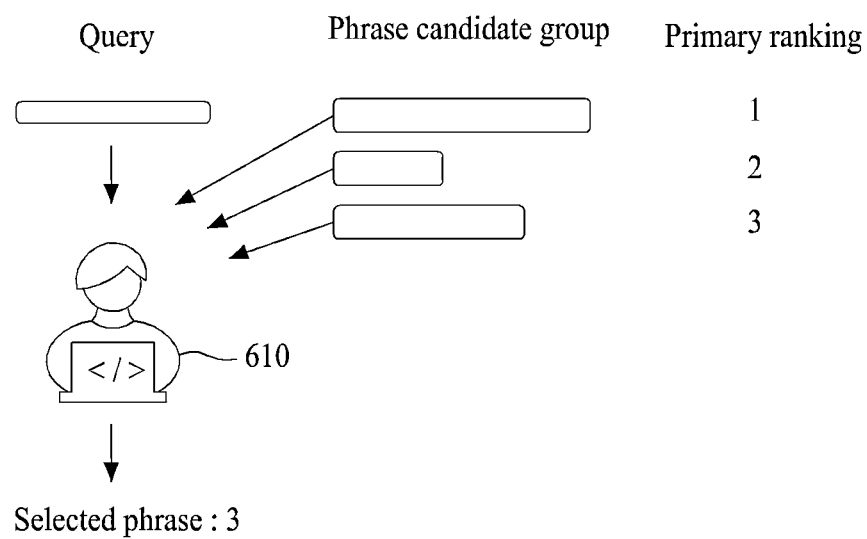
FIG. 6 illustrates an example of designating preference based on conciseness for a length-by-length phrase candidate according to an example embodiment.

FIG. 6 illustrates an example of designating preference based on conciseness for a length-by-length phrase candidate according to an example embodiment. A phrase candidate group for a query may be provided to a labeler 610. For contrastive Learning, the labeler 610 may select a most suitable candidate that provides a correct answer to the query and also provides sufficient context from among phrase candidates of a phrase candidate group predicted by a phrase search model, that is, the phrase encoder 420 for a document containing the correct answer. For example, the labeler 610 may select a most concise phrase that sufficiently answers the query among length-by-length phrases included in the phrase candidate group. As a result, a relatively short phrase may be selected for a concise query and a relatively long phrase may be selected for a complex query. In this case, the inference system may generate learning data in which preference is designated for each phrase candidate based on the query and the phrase candidate group, and the phrase selected by the labeler 610.

Depending on example embodiments, the labeler 610 may select preference for at least one phrase among length-by-length phrases included in the phrase candidate group, instead of selecting the most concise phrase that sufficiently answers the query among the length-by-length phrases included in the phrase candidate group. Here, a guideline for guiding a selection of the labeler 610 may be provided to the labeler 610 to select relatively higher preference for a phrase with a relatively large amount of context for a more complex query and to select relatively higher preference for a phrase with a relatively small amount of context for a more concise query. Through this, the more concise the query, the relatively higher preference may be selected by the labeler 610 for the relatively short phrase, and the more complex the query, the relatively higher preference may be selected by the labeler 610 for the relatively long phrase. In this case, the inference system may generate learning data using the query and the phrase candidate group, and the preference for each phrase candidate designated by the labeler 610.

Figure 7:
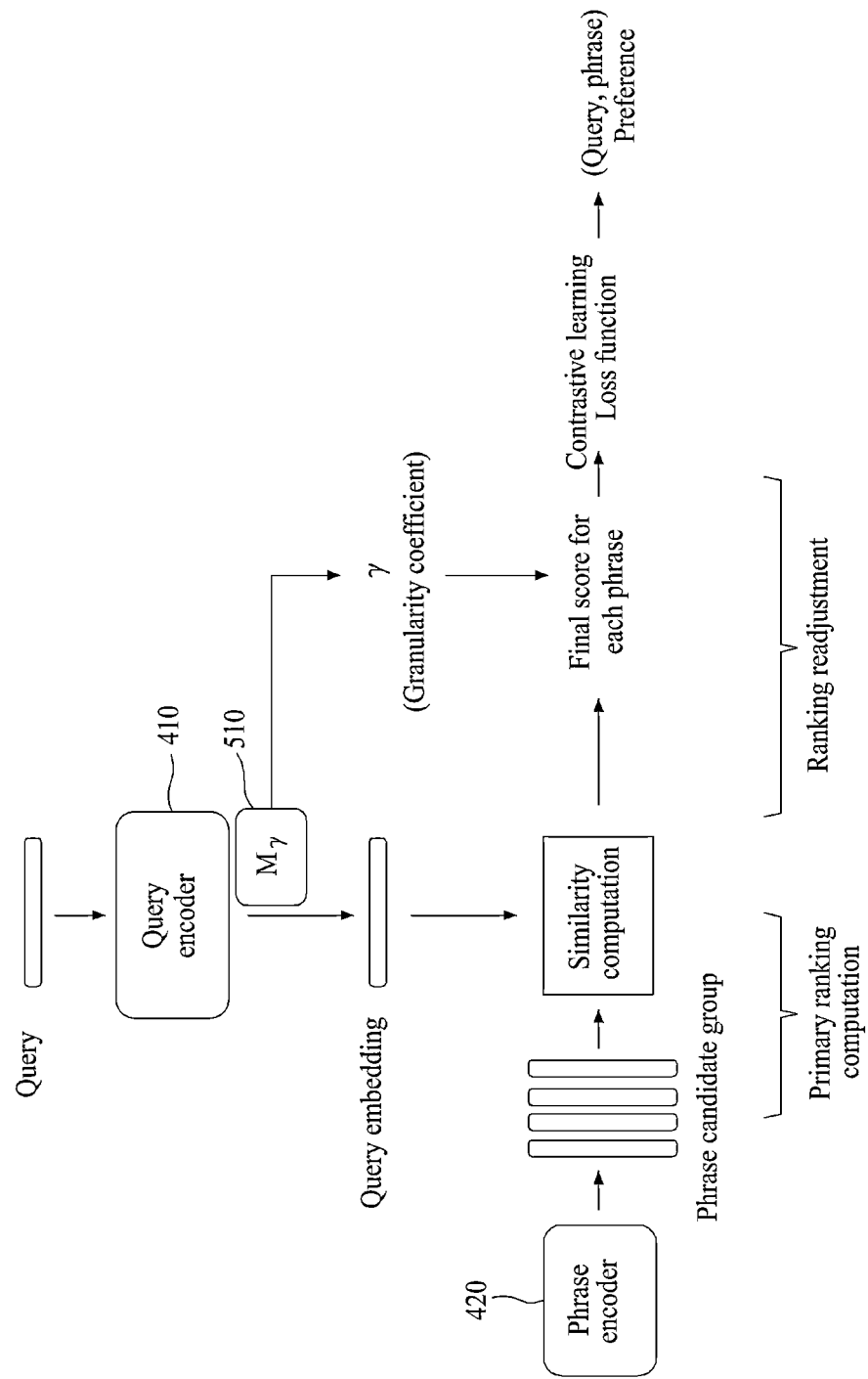
FIG. 7 illustrates an example of contrastive Learning for outputting search results with granularity suitable for query complexity according to an example embodiment.

FIG. 7 illustrates an example of contrastive Learning for outputting search results with granularity suitable for query complexity according to an example embodiment.

The phrase encoder 420 and the query encoder 410 may be pre-trained artificial intelligence models. Here, a ranking set for a certain query through the phrase encoder 420 and the query encoder 410 may differ from a suitable ranking from viewpoint of a person. Therefore, for an arbitrary query, the phrase encoder 420 and the query encoder 410 may be trained to learn difference between the ranking set through the phrase encoder 420 and the query encoder 410 and the ranking set by a person through contrastive Learning (fine-tuning). Therefore, the phrase encoder 420 and the query encoder 410 are contrastively trained (fine-tuned) and, search results with granularity suitable for query complexity may be output during inference. To this end, contrastive Learning may be performed for the phrase encoder 420 and the query encoder 410 to increase the score for a phrase with high preference and to decrease the score for a phrase with low preference. For example, contrastive Learning for the phrase encoder 420 and the query encoder 410 may be performed based on Equation 2 below. The inference system may contrastively train the phrase encoder 420 and the query encoder 410 using preference data collected through a process of FIG. 5. Depending on example embodiments, the inference system may contrastively train the granularity coefficient inference model 510 to output search results with granularity suitable for query complexity. For example, the inference system may perform contrastive Learning for the granularity coefficient inference model 510 to increase the relevance score used for determining the primary ranking for phrases ($p^* \in P$) with high preference and to decrease the relevance score used for determining the primary ranking for phrases with low preference, with respect to the granularity coefficient inference model 510 combined with the query encoder 410. Here, p denotes a phrase and P denotes a set of positive examples of phrases.

Here, a loss function L( ) for contrastive Learning may be computed as shown in Equation 2 below.

$$L(q, p^*; M_\gamma) = -\log \frac{\sum_{p^* \in P} e^{S(q, p^*, \gamma)}}{\sum_{p \in N_i \cup N_r} e^{S(q, p, \gamma)}} \quad \text{[Equation 2]}$$

$$S(q, p) = M_q(q) * M_p(p)$$

Here, q denotes a query, Ni denotes negative examples of phrases in a retrieved document (in-document negative examples), and Nr denotes negative examples of randomly selected phrases. Here, the inference system may fix parameters of the query encoder 410 ($M_q$) and the phrase encoder 440 ($M_p$) and may train only the head model, the granularity coefficient inference model 510 ($M_\gamma$). Comparison group candidates (negative examples) for contrastive Learning use phrases extracted in a correct answer document ($N_i$: in-document negative) and phrases extracted from a random document ($N_r$: random negative). Here, the ratio of $N_i$ and $N_r$ is a hyperparameter and the performance of the granularity coefficient inference model 510 trained through the ratio may vary.

Figure 8:
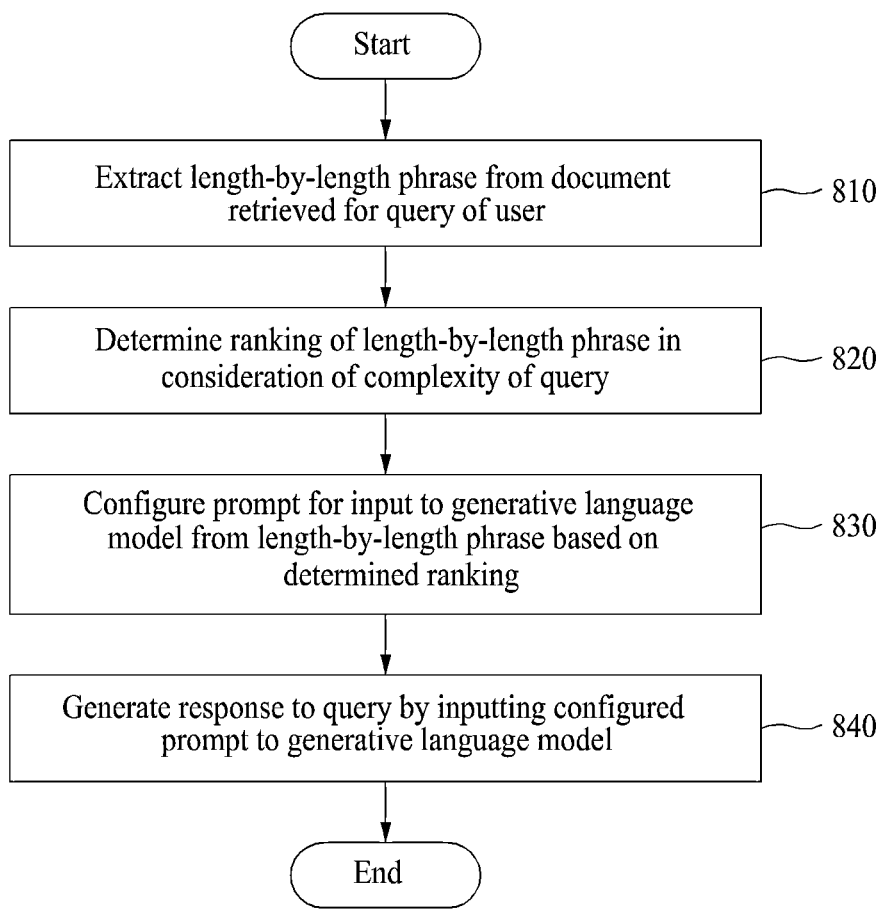
FIG. 8 is a flowchart illustrating an example of an inference method according to an example embodiment.

FIG. 8 is a flowchart illustrating an example of an inference method according to an example embodiment. The inference method according to the example embodiment may be performed by the computer device 100 of FIG. 1. Here, the processor 120 of the computer device 100 may be implemented to execute a control instruction according to a code of at least one computer program or a code of an OS included in the memory 110. Here, the processor 120 may control the computer device 100 to perform operations 810 to 840 included in the method of FIG. 8 in response to a control instruction provided from the code stored in the computer device 100.

In operation 810, the computer device 100 may extract a length-by-length phrase from a document retrieved for a query of a user. For example, the computer device 100 may extract a plurality of phrase embeddings for the length-by-length phrase from the document retrieved for the query of the user using a phrase encoder model (e.g., phrase encoder 420).

In operation 820, the computer device 100 may determine a ranking of the length-by-length phrase in consideration of complexity of the query. For example, the computer device 100 may compute relevance score between a query embedding generated using a query encoder model (e.g., query encoder 410) for the query and each of a plurality of phrase embeddings generated for each length-by-length phrase using the phrase encoder model for the document, and may determine the ranking of the length-by-length phrase based on the relevance score. Also, the computer device 100 may readjust the ranking of the length-by-length phrase according to a phrase length through a granularity coefficient that is determined such that a relatively long phrase has a higher ranking according to an increase in the complexity of the query. To this end, the computer device 100 may predict the granularity coefficient according to the complexity of the query by inputting output (e.g., logit) of an intermediate layer of the query encoder model to a granularity coefficient inference model (e.g., granularity coefficient inference model 510) combined with the query encoder model that generates a query embedding for the query. In this case, the computer device 100 may determine the final ranking of the length-by-length phrase as shown in Equation 1 described above, using the granularity coefficient and a length of each phrase. Here, the granularity coefficient inference model may include a transformer encoder model that uses the output of the intermediate layer of the query encoder model as input to use existing knowledge learned by the query encoder model for the query.

Meanwhile, as described above with reference to FIGS. 6 and 7, the query encoder model that generates a query embedding for the query and the phrase encoder model that generates a plurality of phrase embeddings for the document may be contrastively trained using learning data that is generated by designating preference for each phrase candidate in a pair of query and phrase candidate group. In more detail, the phrase encoder and the query encoder may be contrastively trained to increase the score for a phrase with high preference and to decrease the score for a phrase with low preference.

Using learning data generated by designating preference for each phrase candidate in a pair of query and phrase candidate group with fixing parameters of the query encoder and the phrase encoder model, the granularity coefficient inference model combined with the query encoder model may be contrastively trained. In more detail, the granularity coefficient inference model may be contrastively trained to increase the score of a phrase with high preference and to decrease the score of a phrase with low preference for the given query. Such contrastive Learning may be performed by the computer device 100, but inference may be performed in such a manner that the computer device 100 receives and uses models contrastively trained in the aforementioned manner.

Meanwhile, when performing contrastive Learning, the phrase candidate group may include a plurality of length-by-length phrase candidates, the preference may be designated through a selection of a labeler (e.g., labeler 610) based on conciseness for an arbitrary length-by-length phrase candidate among the plurality of length-by-length phrase candidates. Also, the phrase candidate group may include first phrase candidates extracted from a document containing a correct answer to the query and second phrase candidates extracted for the query from an arbitrary document. Here, the performance of the granularity coefficient inference model combined with the query encoder model may be controlled through a ratio between the number of the first phrase candidates and the number of the second phrase candidates.

In operation 830, the computer device 100 may configure a prompt for input to a generative language model from the length-by-length phrase based on the determined final ranking.

In operation 840, the computer device 100 may generate a response to the query by inputting the configured prompt to the generative language model.

Since the final ranking for length-by-length phrases is adjusted according to the complexity of the query, the generative language model may provide detailed context for a complex query and may provide concise context for a simple query. That is, the generative language model may adjust granularity of text to be returned in an inference process and may fine-tune the query encoder and the phrase encoder through contrastive Learning according to the complexity of the query and the document.

As described above, according to example embodiments, there may be provided an inference method and system that may configure a prompt for input to a generative language model based on a ranking of a phrase, which is determined by further reflecting a phrase length as well as correlation between a query and a phrase.

The systems and/or the apparatuses described herein may be implemented using hardware components, software components, and/or combination thereof the hardware components and the software components. For example, the apparatuses and the components described herein may be implemented using one or more general-purpose or special purpose computers, such as, for example, a processor, a controller, an arithmetic logic unit (ALU), a digital signal processor, a microcomputer, a field programmable gate array (FPGA), a programmable logic unit (PLU), a microprocessor, or any other device capable of responding to and executing instructions in a defined manner. A processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciate that the processing device may include multiple processing elements and/or multiple types of processing elements. For example, the processing device may include multiple processors or a processor and a controller. In addition, different processing configurations are possible, such as parallel processors.

The software may include a computer program, a piece of code, an instruction, or some combinations thereof, for independently or collectively instructing or configuring the processing device to operate as desired. Software and/or data may be embodied permanently or temporarily in any type of machine, component, physical equipment, virtual equipment, or computer storage medium or device, to provide instructions or data to or to be interpreted by the processing device. The software also may be distributed over network coupled computer systems so that the software is stored and executed in a distributed fashion. The software and data may be stored by one or more computer readable storage mediums.

The methods according to the example embodiments may be recorded in non-transitory computer-readable media including program instructions to implement various operations embodied by a computer. Also, the media may include, alone or in combination with the program instructions, data files, data structures, and the like. The media may continuously store computer-executable programs or may temporarily store the same for execution or download. Also, the media may be various types of recording devices or storage devices in a form in which one or a plurality of hardware components are combined. Without being limited to media directly connected to a computer system, the media may be distributed over the network. Examples of non-transitory computer-readable media include magnetic media such as hard disks, floppy disks, and magnetic tapes; optical media such as CD ROM and DVD; magneto-optical media such as floptical disks; and hardware devices that are specially to store and perform program instructions, such as read-only memory (ROM), random access memory (RAM), flash memory, and the like. Examples of other media may include recording media and storage media managed by an app store that distributes applications or a site, a server, and the like that supplies and distributes other various types of software. Examples of the program instructions include a machine language code such as produced by a compiler and an advanced language code executable by a computer using an interpreter.

While this disclosure includes specific example embodiments, it will be apparent to one of ordinary skill in the art that various alterations and modifications in form and details may be made in these example embodiments without departing from the spirit and scope of the claims and their equivalents. For example, suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An inference method performed by a computer device comprising at least one processor, the inference method comprising:
   extracting, by the at least one processor, a length-by-length phrase from a document retrieved for a query of a user;
   determining, by the at least one processor, a ranking of the length-by-length phrase in consideration of complexity of the query; and
   configuring, by the at least one processor, a prompt for input to a generative language model based on the determined ranking,
   wherein the determining the ranking of the length-by-length phrase comprises determining the ranking of the length-by-length phrase such that a relatively long phrase has a higher ranking according to an increase in the complexity of the query,
   wherein a query encoder model that generates a query embedding for the query and a phrase encoder model that generates a plurality of phrase embeddings for the document are contrastively trained using learning data that is generated by designating preference for each phrase candidate in a pair of query and phrase candidate group,
   wherein the phrase candidate group includes a plurality of length-by-length phrase candidates, and
   wherein the preference is designated for each length-by-length phrase candidate by
   selecting a relatively higher preference value for a length-by-length phrase candidate with a relatively large amount of context in response to the complexity of the query being relatively high, and
   selecting a relatively higher preference value for a length-by-length phrase candidate with a relatively small amount of context in response to the complexity of the query being relatively low.

2. The inference method of claim 1, wherein the determining the ranking of the length-by-length phrase comprises computing relevance score between the query embedding generated using the query encoder model for the query and each of the plurality of phrase embeddings generated for each length-by-length phrase using the phrase encoder model for the document, and determining the ranking of the length-by-length phrase based on the relevance score.

3. The inference method of claim 1, wherein the determining the ranking of the length-by-length phrase comprises readjusting the ranking of the length-by-length phrase according to a phrase length through a granularity coefficient that is determined such that the relatively long phrase has the higher ranking according to the increase in the complexity of the query.

4. The inference method of claim 3, wherein the readjusting comprises predicting the granularity coefficient according to the complexity of the query by inputting output of an intermediate layer of the query encoder model to a granularity coefficient inference model combined with the query encoder model that generates the query embedding for the query.

5. The inference method of claim 4, wherein the granularity coefficient inference model includes a transformer encoder model that uses the output of the intermediate layer of the query encoder model as input to use existing knowledge learned by the query encoder model for the query.

6. The inference method of claim 1,
   wherein the preference is designated for each phrase candidate by a selection of a labeler on an arbitrary length-by-length phrase candidate among the plurality of length-by-length phrase candidates, and
   wherein a guideline for guiding the selection of the labeler is provided to the labeler
   to select a relatively higher preference value for the length-by-length phrase candidate with the relatively large amount of context in response to the query being a more complex query, and
   to select a relatively higher preference value for each length-by-length phrase candidate with the relatively small amount of context in response to the query being a more concise query.

7. An inference method performed by a computer device comprising at least one processor, the inference method comprising:
   extracting, by the at least one processor, a length-by-length phrase from a document retrieved for a query of a user;
   determining, by the at least one processor, a ranking of the length-by-length phrase in consideration of complexity of the query; and
   configuring, by the at least one processor, a prompt for input to a generative language model based on the determined ranking,
   wherein the determining the ranking of the length-by-length phrase comprises determining the ranking of the length-by-length phrase such that a relatively long phrase has a higher ranking according to an increase in the complexity of the query,
   wherein a query encoder model that generates a query embedding for the query and a phrase encoder model that generates a plurality of phrase embeddings for the document are contrastively trained using learning data that is generated by designating preference for each phrase candidate in a pair of query and phrase candidate group, and
   wherein the phrase candidate group includes first phrase candidates extracted from a document containing a correct answer to the query and second phrase candidates extracted for the query from an arbitrary document, and
   performance of a granularity coefficient inference model combined with the query encoder model is controlled through a ratio between the number of the first phrase candidates and the number of the second phrase candidates.

8. The inference method of claim 1, wherein, using learning data generated by designating preference for each phrase candidate in a pair of query and phrase candidate group with fixing parameters of the query encoder model that generates the query embedding for the query and the phrase encoder model that generates the plurality of phrase embeddings for the document, a granularity coefficient inference model combined with the query encoder model is contrastively trained.

9. The inference method of claim 1, further comprising:
generating, by the at least one processor, a response to the query by inputting the configured prompt to the generative language model.

10. A non-transitory computer-readable recording medium storing a program to execute the method of claim 1 on a computer device.

11. A computer device comprising:
at least one processor configured to execute computer-readable instructions,
wherein the at least one processor is configured to,
extract a length-by-length phrase from a document retrieved for a query of a user,
determine a ranking of the length-by-length phrase in consideration of complexity of the query, and
configure a prompt for input to a generative language model based on the determined ranking, and
to determine the ranking of the length-by-length phrase, the at least one processor is configured to determine the ranking of the length-by-length phrase such that a relatively long phrase has a higher ranking according to an increase in the complexity of the query,
wherein a query encoder model that generates a query embedding for the query and a phrase encoder model that generates a plurality of phrase embeddings for the document are contrastively trained using learning data that is generated by designating preference for each phrase candidate in a pair of query and phrase candidate group,
wherein the phrase candidate group includes a plurality of length-by-length phrase candidates, and
wherein the preference is designated for each length-by-length phrase candidate by
selecting a preference value for a length-by-length phrase candidate based on relevance between the query and the length-by-length phrase candidate and conciseness of the length-by-length phrase candidate.

12. The computer device of claim 11, wherein, to determine the ranking of the length-by-length phrase, the at least one processor is configured to compute relevance score between the query embedding generated using the query encoder model for the query and each of the plurality of phrase embeddings generated for each length-by-length phrase using the phrase encoder model for the document, and to determine the ranking of the length-by-length phrase based on the relevance score.

13. The computer device of claim 11, wherein, to determine the ranking of the length-by-length phrase, the at least one processor is configured to readjust the ranking of the length-by-length phrase according to a phrase length through a granularity coefficient that is determined such that the relatively long phrase has the higher ranking according to the increase in the complexity of the query.

14. The computer device of claim 11,
wherein the preference is designated for each length-by-length phrase candidate by a selection of a labeler on an arbitrary length-by-length phrase candidate among the plurality of length-by-length phrase candidates, and
wherein the selection of the labeler is based on relevance between the query and the arbitrary length-by-length phrase candidate and conciseness of the arbitrary length-by-length phrase candidate.

15. The computer device of claim 11, wherein the phrase candidate group includes first phrase candidates extracted from a document containing a correct answer to the query and second phrase candidates extracted for the query from an arbitrary document, and
performance of a granularity coefficient inference model combined with the query encoder model is controlled through a ratio between the number of the first phrase candidates and the number of the second phrase candidates.

16. The computer device of claim 11, wherein, using learning data generated by designating a preference for each phrase candidate in a pair of query and phrase candidate group with fixing parameters of the query encoder model that generates the query embedding for the query and the phrase encoder model that generates the plurality of phrase embeddings for the document, a granularity coefficient inference model combined with the query encoder model is contrastively trained.

* * * * *